US007951850B2

(12) United States Patent
Huo et al.

(10) Patent No.: US 7,951,850 B2
(45) Date of Patent: May 31, 2011

(54) POLYMER COMPOSITES HAVING HIGHLY DISPERSED CARBON NANOTUBES AND METHODS FOR FORMING SAME

(75) Inventors: Qun Huo, Orlando, FL (US); Saiful Khondaker, Oviedo, FL (US); Jianhua Zou, Orlando, FL (US); Lei Zhai, Oviedo, FL (US); Hui Chen, Mountain View, CA (US); Harish Muthuraman, Orlando, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 293 days.

(21) Appl. No.: 12/050,780

(22) Filed: Mar. 18, 2008

(65) Prior Publication Data

US 2009/0001325 A1 Jan. 1, 2009

Related U.S. Application Data

(60) Provisional application No. 60/895,573, filed on Mar. 19, 2007.

(51) Int. Cl.

*B60C 1/00* (2006.01)
*C08K 3/04* (2006.01)

(52) U.S. Cl. .......... 522/161; 522/157; 522/70; 524/495; 524/496; 977/742

(58) Field of Classification Search .................. 524/543, 524/570, 496, 495; 523/136; 252/511; 522/161, 522/157, 70

See application file for complete search history.

(56) References Cited

U.S. PATENT DOCUMENTS

2003/0207984 A1 * 11/2003 Ding et al. .................... 524/543
2005/0245667 A1 * 11/2005 Harmon et al. ............... 524/496

* cited by examiner

*Primary Examiner* — Ling-Siu Choi
*Assistant Examiner* — Monique Peets
(74) *Attorney, Agent, or Firm* — Jetter & Associates, P.A.

(57) ABSTRACT

A method of forming carbon nanotube-polymer composites includes the steps of forming a mixture solution including a plurality of carbon nanotubes dispersed in a co-solvent. The co-solvent includes an organic solvent and a second solvent being a short chain fluorinated carboxylic acid having a boiling point below 150° C. which is less oxidizing than nitric acid, and is soluble in both the organic solvent and water. The first polymer is mixed with the mixture solution to form a polymer including mixture. The co-solvent is removed from the polymer mixture to form a dispersed nanotube-polymer composite. The second solvent can be trifluoroacetic acid.

12 Claims, 7 Drawing Sheets

(PRIOR ART) (PRIOR ART)

POLYMER COMPOSITES HAVING HIGHLY DISPERSED CARBON NANOTUBES AND METHODS FOR FORMING SAME

CROSS-REFERENCE TO RELATED APPLICATIONS

The present application claims the benefit of U.S. provisional patent application No. 60/895,573 entitled "HIGHLY DISPERSED CARBON NANOTUBES POLYMER COMPOSITES AND METHODS FOR FORMING" filed on Mar. 19, 2007, which is incorporated by reference in its entirety into the present application.

STATEMENT REGARDING FEDERALLY SPONSORED RESEARCH OR DEVELOPMENT

The U.S. Government may have certain rights to embodiments of the invention based on National Science Foundation NIRT award (DMI 0506531) and NER award (CBET 0608870).

FIELD OF THE INVENTION

The present invention relates to polymer composites, more particular to carbon nanotube comprising polymer composites, and methods for forming the same.

BACKGROUND

Carbon nanotubes (CNTs) have significant attention due to their mechanical, thermal, and electrical properties. Recently there have been significant research activities regarding development of CNT/polymer nanocomposite materials. CNT/polymer nanocomposites have shown promise in applications such as electromagnetic interference (EMI) shielding, photovoltaic devices, and gas sensors.

For example, CNT/polymer nanocomposites are highly sought-after candidates to replace traditional metal and metal alloys for aircraft manufacturing. However, significant limitations still exist which prevent the potential of these nanocomposites from being fully exploited. In the fabrication of nanocomposite materials, a good dispersion and adhesion of nanofillers with polymer matrices generally play an important role towards obtaining nanocomposite materials with expectant and reproducible properties and performances. However, the as-produced CNTs are held together in bundles by strong van der Waals interactions. The bundling interferes with CNT dispersability and results in diminished electrical and mechanical properties of the nanocomposite as compared to theoretical predictions. Also, the commercially available samples generally contain a significant concentration of impurities, such as amorphous carbon and catalytic metal particles used for conventional nanotube synthesis.

Most nanotube purification methods involve nitric acid treatment. This treatment leads to oxidation of the CNT outer walls, causing disruption of the conjugated electronic structure and sometimes shortening of the CNTs. As a result, the electrical conductivity and the aspect ratios of CNTs purified by nitric acid tend to decrease.

Other than strong acid treatment, a wide range of nondestructive chemical modification methods have also been reported to obtain increased dispersion of CNTs in solution. However most of these methods involve the use of surfactants or other chemicals to assist in the dispersion process. After the nanocomposite materials are processed and dried, the surfactants and chemicals generally remain in the final composite material as additives, which can significantly adversely affect the resulting properties of the composite material.

SUMMARY

This summary is provided to comply with 37 C.F.R. §1.73, requiring a summary of the invention briefly indicating the nature and substance of the invention. It is submitted with the understanding that it will not be used to interpret or limit the scope or meaning of the claims.

A method of forming carbon nanotube-polymer composites comprises the step of forming a mixture solution comprising a plurality of carbon nanotubes dispersed in a co-solvent comprising an organic solvent and a second solvent comprising a short chain fluorinated carboxylic acid. The second solvent has a boiling point at STP <150° C., is less oxidizing than nitric acid, and is soluble in both the organic solvent and water. In one embodiment the boiling point of the second solvent is <100° C., such as provided by trifluoroacetic acid (TFA).

A lower boiling point solvent will increase volatility which generally helps remove the second solvent after formation of the composite is complete.

The first polymer is mixed with the mixture solution to form a polymer comprising mixture. The co-solvent is removed from the polymer comprising mixture to form a dispersed nanotube-polymer composite. The carbon nanotubes used in the method are provided non-functionalized and are generally not functionalized during the method so that the resulting nanotube-polymer composite consists essentially of non-functionalized nanotubes. As used herein, the phrase "non-functionalized nanotubes" refers to pristine nanotubes that lack surface modification, such as nanotubes made from chemical vapor deposition or other methods without any additional chemical treatment. One example of chemical treatment is oxidation, such as due to exposure to an acid (e.g. nitric acid) that is known to form COOH groups on the nanotube surface.

A carbon nanotube-polymer composite comprises a first polymer continuous phase, and a plurality of carbon nanotubes dispersed in the first polymer. The carbon nanotubes in the composite consist essentially of non-functionalized nanotubes. One identifying characteristic of composites according to embodiments of the invention is generally the inclusion of the short chain fluorinated carboxylic acid (e.g. TFA) in a concentration from 0.1 ppm to 1 ppb. The composite can comprise a second polymer different from the first polymer, wherein the second polymer is an electrically conducting polymer (CP). In this embodiment the composite can have a higher electrical conductivity as compared to the electrical conductivity of the CP.

BRIEF DESCRIPTION OF THE DRAWINGS

FIG. 5(*b*) shows measured electrical conductivity for a MWNT/P3HT/PMMA composite according to an embodiment of the invention in the range of 0 to 0.1 wt. % P3HT.

FIG. 6(*b*) shows a scanned TEM image of a PEDOT/MWNT composite according to an embodiment of the invention.

DETAILED DESCRIPTION

Figure 1A:
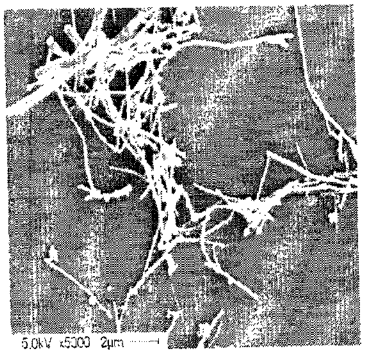
FIG. 1(a) (PRIOR ART)
FIG. 1 shows scanned SEM images of (a) prior art multi-walled carbon nanotubes (MWNTs), (b) MWNTs dispersed in TFA/DMF solvent according to an embodiment of the invention, and (c) MWNTs purified and dispersed in a TFA/DMF solvent according to another embodiment of the invention, respectively.

Embodiments of the present invention will now be described more fully hereinafter with reference to the accompanying drawings, in which exemplary embodiments of the present invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms “a”, “an” and “the” are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the invention describe methods for forming dispersed carbon nanotube-polymer composites, and related compositions of matter. The carbon nanotubes (CNTs) can comprises single wall nanotubes (SWNTs), multi-walled nanotubes (MWNTs), or mixtures of the same in various ratios.

In a first inventive embodiment, a mixture solution is formed comprising a plurality of CNTs dispersed in a co-solvent comprising an organic solvent and a second solvent which comprises a short chain fluorinated carboxylic acid. The second solvent generally comprises 1 to 20 volume % of the co-solvent. The short chain (generally ≦4 carbon) fluorinated carboxylic acid has a boiling point generally <150° C., such as <100°, is less oxidizing than nitric acid, and is soluble in the organic solvent. The short chain fluorinated carboxylic acid can comprise trifluoroacetic acid ($CF_3CO_2H$; hereafter TFA). TFA provides an unusual combination of properties including a relatively low boiling point (around 72° C.), excellent miscibility and solubility with a wide variety of both organic and inorganic compounds. Another example of a short chain fluorinated carboxylic acid is difluoroacetic acid (DFA). The boiling point of DFA is 132-134° C. The relatively low oxidizing strength of the second solvent results in minimal oxidation of the carbon nanotubes, and thus retention of its highly electrically conducting properties.

At least a first polymer is then mixed with the mixture solution to form a polymer comprising mixture. The solvents are then removed, such as by drying under vacuum, to form a highly dispersed nanotube composite. In the resulting composite, there can generally be from 0.001 to 40% by weight carbon nanotubes, and from 99.999 to 60% by weight polymer. In one embodiment, the composite comprises 1 to 10% by weight carbon nanotubes, and from 99 to 90% by weight polymer. The steps in methods according to embodiments of the invention can be performed at or near room temperature.

Although almost all the solvents are removed in the removing step, there generally remains trace residual amounts of the second solvent (e.g. TFA) remaining in the final composite material that can be used to distinguish composites according to embodiments of the invention as compared to composites having the same polymer(s) and CNTs but formed by a different method. The traces of the second solvent will generally be complexed to the polymer(s) and/or the CNTs. The trace level of the second solvent can be generally quantified using X-ray photoelectron spectroscopy, atomic absorption or emission, or other elementary analysis technique. The trace concentration is generally in the ppm to ppt range, such as 0.1 ppm to 1 ppt.

The dispersion of the carbon nanotubes has been verified by scanning electron microscopic (SEM) and transmission electron microscope (TEM) analysis which have both demonstrated the absence of detectable aggregation or bundling of the CNTs. Percolation threshold can also be used for generally qualitative comparisons or estimates of dispersion levels.

In one embodiment of the invention, upon which the first inventive embodiment will generally be described, the short chain fluorinated carboxylic acid comprises TFA. TFA is a strong but non-oxidative acid that is miscible with most commonly used organic solvents. Mixture of TFA in an organic solvent is often used to dissolve organic chemicals that are difficult to dissolve in other solvent systems. Although not fully understood, the strong salvation ability of TFA is believed to be due to the strong electron withdrawing property of the three (3) fluoro groups and the strong dipole moment provided by the TFA molecule. TFA and certain related short chain fluorinated carboxylic acid materials have been found by the present Inventors to provide highly dispersed CNTs in organic solvents and polymer matrices.

Tests performed by the present inventors using TFA have confirmed this. As described below, using a co-solvent system comprising TFA and the organic solvent tetrahydrofuran (THF) or N,N-dimethylformamide (e.g. 5-10 vol. % of TFA), the present Inventors fabricated a CNT/PMMA nanocomposite thin film materials using MWNTs with different aspect ratios. Results obtained show this embodiment of the invention improves the dispersion of CNTs in polymer systems (described in the Examples below). As contrasted from known nitric acid treatment, the CNTs according to embodiments of the invention are not functionalized (e.g. oxidized) by the treatment with TFA, as supported by XPS data, such as described below relative to FIG. 2(*a*)-(*c*). Furthermore, TFA is a highly volatile solvent. After drying of the composite material is completed, TFA will evaporate, leaving very low trace levels in the nanocomposite. The resulting CNT nanocomposite materials have been found to have significantly improved electrical and mechanical properties as compared to available nanotube-polymer composites.

One variation of the first inventive embodiment adds an electrically conducting polymer (CPs) to fabricate ternary CNT-CP-host polymer nanocomposite materials. CPs generally comprise conjugated chains with π-electrons delocalized along the polymer backbone. The electrical properties of CPs can be changed from being semiconductive in its neutral state (e.g. $10^{-8}$ S/cm), to an electrically conducting state (e.g. $10^{-3}$ to $10^{4}$ S/cm) when oxidized or reduced. Due to their unique optical and electrical properties, CPs have numerous potential applications in a wide range of areas such as sensing, energy storage, and photovoltaics. However, more extensive applications of CPs are still limited due to their difficulty of processing. Similar to CNTs, conducting polymers are rigid conjugated macromolecules with strong π-π stacking interactions between polymer chains, making these polymers difficult to dissolve and process.

The present Inventors have successfully developed a series of CPs generally based on modification of the polymer backbone or pendent groups that are readily soluble in organic solvents, such as tetrahydrofuran. As used herein, a CP refers to a polymer that provides an electrical conductivity of at least $10^{-3}$ S/cm in its electrically conducting state. The CP solution is essentially fully miscible with a CNT dispersion prepared using TFA as a co-solvent. It has been found that soluble conducting polymers can further improve the dispersion of CNTs in solution.

Although not required to any embodiment of the claimed invention, Applicants, not seeking to be bound by any mechanism, provide the following that may explain certain advantageous performance aspects of composite materials according to embodiments of the invention. The electrical conductivity of a CNT-based composite material is not only related to the loading ratio of the CNT, but may also depend on the tunnel barrier created by the host material between nanotubes. When a good dispersion is generally obtained, the nanotubes may become wetted by the host material. As the nanotube loading ratio is increased, the nanotubes generally may become closer and the carrier hopping from nanotube to nanotube can occur through the tunnel barrier of the host material. The addition of a CP as a third component in carbon nanotube-polymer composite material may facilitate electron hopping among nanotubes by reducing the tunnel barrier, leading to a reduced the percolation threshold, and improving the electrical conductivity of the ternary composite material. The synergistic effect of carbon nanotubes and conducting polymers is believed to likely lead to a ternary nanocomposite material with advantageous electrical properties.

In another inventive embodiment, a method of forming ternary carbon nanotube-polymer composites comprises the step of forming a dispersed mixture solution comprising a plurality of dispersed CNTs, at least one surfactant, and a first polymer in water or other polar solvent (e.g. methanol or acetone) comprising solvent solution. A monomer is added to the dispersed mixture solution. The monomer is then polymerized to form a dispersed ternary nanotube-comprising composite. In one embodiment, a water dispersible conducting polymer/MWNT composite with high electrical conductivity is formed, such as with the CP PEDOT. The composite can utilize a variety of other CPs, such as polypyrrole, and polyaniline. The group of suitable conjugated polymers can generally include conjugated polymers for which polymerization can be initiated by an initiator after monomer is added to the dispersed carbon nanotube solution (e.g. addition polymerization).

EXAMPLES

It should be understood that the Examples described below are provided for illustrative purposes only and do not in any way define the scope of the invention.

Dispersion of Carbon Nanotubes in Polymer Matrices Using Trifluoroacetic Acid as a Co-Solvent A dispersion of MWNTs was tested in a variety of organic solvents including N,N-dimethylformamide (DMF), dichloromethane, hexanol, toluene, tetrahydrofuran, and acetonitrile using sonication. The MWNTs used were CNTs generally with diameters of 110-150 nm and lengths of 5-9 μm. The aspect ratio of these nanotubes was around 100. Although the CNTs show some good dispersion in some solvents such as DMF and hexanol, it is believed that the good dispersion is due to the high viscosity of the solvents. Unfortunately, both DMF and hexanol are not good solvents for polymer processing, because both solvents have high boiling points and/or high viscosity. After adding 5-10% TFA into the organic solvents, overall, the dispersity of the CNTs in all these solvents was found to increase significantly. The samples were found to only need to be sonicated for about 30-60 minutes to achieve a good dispersion. Furthermore, a bath type sonicator instead of a probe-sonicator was used for dispersion. This shortened sonication time and lowered sonication power significantly, and reduced the potential mechanical damage to the nanotubes. After the sonication, the CNTs remained to be dispersed in DMF, hexanol, dichloromethane and tetrahydrofuran for hours without significant precipitation. Among the different solvents tested, the best dispersion was obtained using a TFA/tetrahydrofuran mixed solvent system. Tetrahydrofuran is a good solvent for many organic polymers with low boiling point and viscosity, therefore, generally a better solvent for processing of polymers. In addition to tetrahydrofuran, the good dispersion of CNTs in TFA/acetonitrile mixed solvent is also encouraging, because similar to THF, acetonitrile is also a low boiling point and low viscosity solvent, and many polymers are readily soluble in acetonitrile.

Figure 1B:
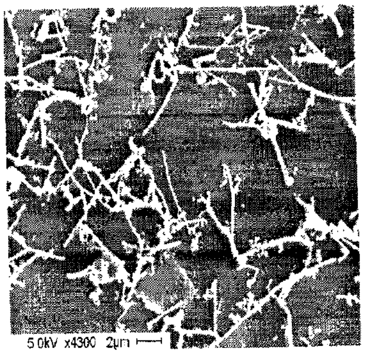
Figure 1C:
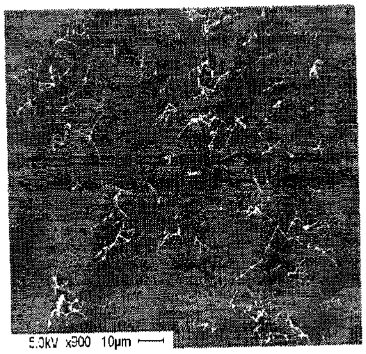

Good dispersion of MWNTs in a co-solvent solution of TFA/DMF was visualized by scanning electron microscopy (SEM) as shown in the scanned SEMs shown in FIG. 1(*b*). From the comparison of as-received MWNTs (FIG. 1(*a*)) and nanotubes dispersed in TFA/DMF solvent (FIG. 1(*b*)), it can be seen from the SEMs that the dispersion of CNTs improved dramatically with TFA as a cosolvent. It was also found that the combined TFA-DMF solvent system can be used to purify the CNTs by generally eliminating small carbon and catalyst particles. As shown in FIG. 1(*c*), after five cycles of washing/centrifugation and redispersion in TFA/DMF solvent, there is a significant decrease of impurity particles in the CNT sample without shortening the nanotubes.

Figure 2:
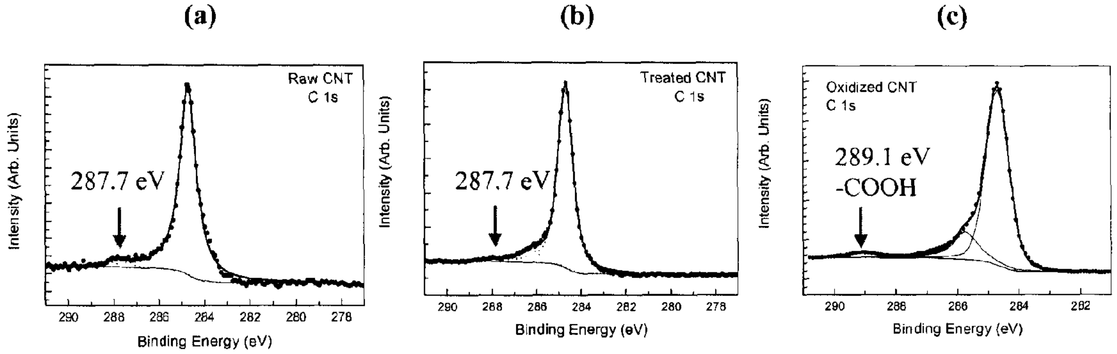
FIG. 2(*a*)-(*c*) show scanned X-ray Photoelectron Spectroscopy (XPS) spectra of prior art as-received MWNTs, TFA-treated MWNTs according to an embodiment of the invention, and prior art nitric acid-treated MWNTs, respectively.

As noted above, treatment by strong acids, such as nitric acid, has been used routinely for improving the solubility and dispersion of CNTs in various solvents. However, nitric acid treatment is known to cause oxidation of the nanotube surface, destroying or at least damaging the conjugated structure and as a result decreasing the electrical conductivity of the nanotubes. The structural integrity of the CNTs after treatment by TFA according to the present invention was investigated by XPS. From the comparison of the XPS spectra of the as-received MWNTs (FIG. 2(*a*)) with TFA-treated according to an embodiment of the invention (FIG. 2(*b*)) and known nitric acid treated MWNTs (FIG. 2(*c*)), it is clear that TFA-treated nanotubes according to an embodiment of the invention were not measurably oxidized. In contrast, nanotubes treated by nitric acid (FIG. 2(*c*)) showed a clear signal of oxidized carbon at 289.1 eV in the form of COOH groups in the XPS spectrum. FIG. 2(*b*) also shows significantly reduced impurity carbon peaks at around 287.7 eV after multiple purifying TFA/DMF washing cycles, agreeing with the SEM observations obtained.

Figure 3:
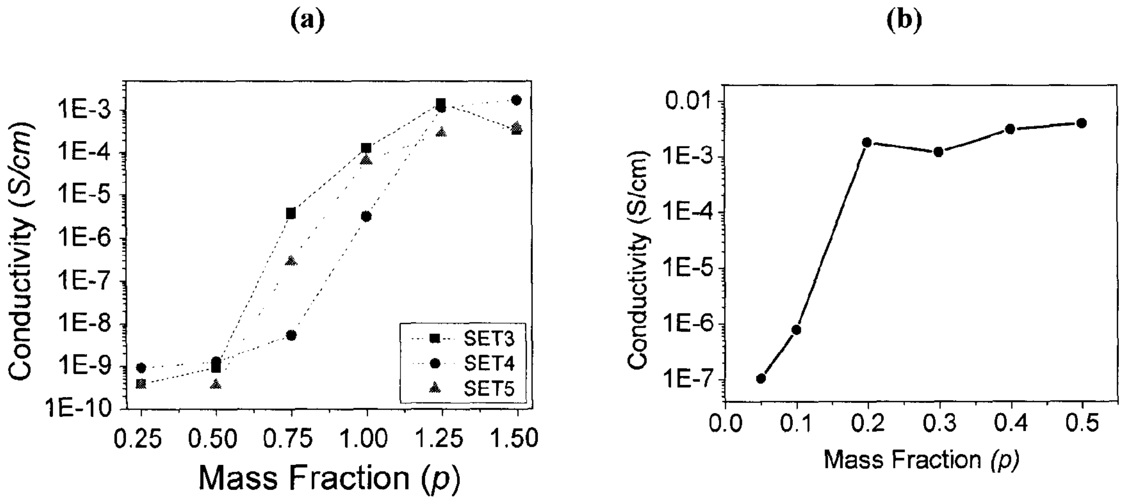
FIG. 3(*a*) is a 25° C. plot of the electrical conductivity of composite films according to an embodiment of the invention versus carbon nanotube loading ratio (mass fraction) using MWNTs with an aspect ratio of 100, while FIG. 3(*b*) is a related plot for a MWNT aspect ratio of 1,000.
Figure 4:
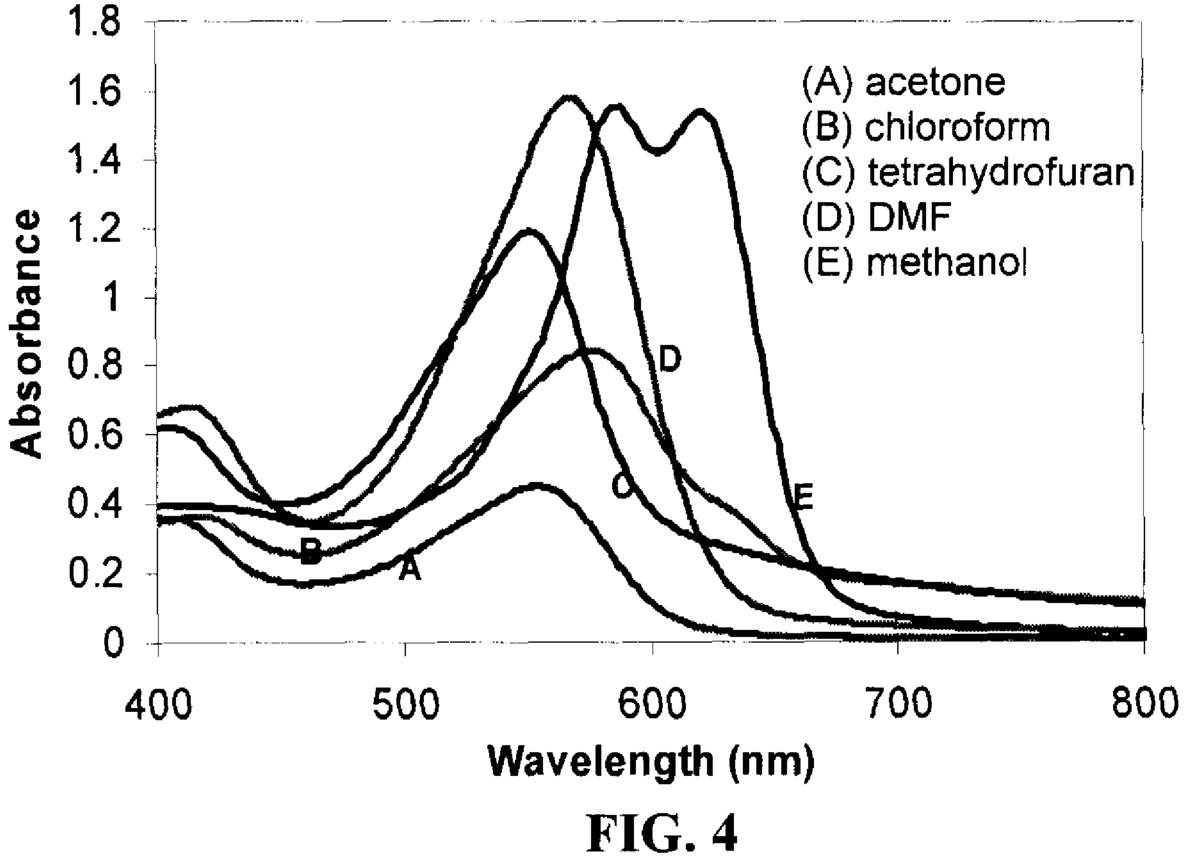
FIG. 4 shows known UV-Vis absorption data for Poly(3,4-ethylenedioxythiophene) (PEDOT) in acetone (A), chloroform (B), tetrahydrofuran (C), DMF (D) and methanol (E).

Fabrication of CNT/PMMA Nanocomposite Thin Film Materials and Electrical Conductivity Study Using MWNTs dispersed in TFA/THF solutions according to an embodiment of the invention, the present inventors fabricated nanotube/PMMA composite films using a draw down bar casting method. PMMA solids or THF solutions of PMMA were mixed with CNT suspensions weight ratio ranging from 0.2 to 1.5%. The dc electrical conductivity measurements of the MWNT/PMMA composites were determined using a standard two point contact method with a Keithley 2400 (for lower resistance) and 6517 (for high resistance) instrument. FIGS. 3(*a*) and (*b*) are 25° C. plots of electrical conductivity of composite films according to the invention versus carbon nanotube loading ratio using MWNTs with an aspect ratio of 100 and 1,000, respectively. From the data, it can be seen that the electrical conductivity of the nanocomposite films follows a typical percolation threshold theory. The percolation threshold of the nanocomposite films, defined herein as the CNT filler content required to achieve a 25° C. electrical conductivity $\sigma >= 10^{-8}$ S/cm for a CNT/dielectric polymer composite, was found to be 0.67±0.08 wt % of MWNT loading for MWNTs having an aspect ratio of 100 shown in FIG. 3(*a*). All three sets of samples shown in FIG. 3(*a*) gave about the same percolation threshold. This excellent reproducibility is a strong indication of a good dispersion of carbon nanotubes in the polymer matrix. At approximately loading ratio of 1.25%, the electrical conductivity of the nanocomposite can be seen to have become stabilized at about $10^{-3}$ S/cm.

Based on the initial tests performed, it was hypothesized that by using higher aspect ratio MWNTs, the percolation threshold could be significantly decreased. The higher aspect ratio of carbon nanotubes may facilitate the formation of a continuous nanotube network, leading to increased electrical conductivity. Indeed, similar studies conducted on MWNTs shown in FIG. 3(*b*) with an aspect ratio of 1,000 (diameter of about 20 nm, and length of about 20 μm). The high aspect ratio MWNTs were also successfully dispersed in TFA/THF solvents. The conductivity measurement of nanocomposites prepared from this high aspect ratio MWNT showed a much lower percolation threshold. At a nanotube weight ratio of 0.05 wt %, the electrical conductivity of the nanocomposite film is already on the order of $10^{-7}$ S/cm.

Synthesis of Soluble Conjugated Polymers

As known in the art, certain electrically conducting and electrochemically active polymers can be synthesized using electrochemical synthesis and oxidation polymerization where monomers such as thiophene, aniline or pyrrole undergo oxidation when exposed to a positive (i.e. anodic) electrode potential or oxidants (i.e. $FeCl_3$), yielding cation radicals or other reactive species. Once formed, these species trigger the polymerization process to form oligomers and/or polymers. Usually, these methods are relatively straightforward and easy to perform. However, the resultant polymers are generally not soluble in solvents. For example, poly (3,4-ethylenedioxy thiophene; PEDOT) synthesized using such methods is not soluble in common solvents. Many potential applications of conjugated polymers are significantly limited due to this solubility issue.

Using a two-phase (e.g. aqueous solution-methylene chloride) system, the present Inventors have successfully synthesized organic-soluble PEDOT polymer via an oxidation polymerization. More generally, the two phase-system can be made from a variety of immiscible liquid combinations, such as water and an oil. In the test performed, iron nitrate nonahydrate was dissolved in distilled water. Then tetraoctylammonium bromide (TOAB), a chain transfer agent, was dissolved in methylene chloride and mixed with the aqueous iron nitrate solution. 3,4-Ethylenedioxy thiophene (EDOT) was then added to this mixture under stirring. Polymerization was carried out for 24 hours. The solution was mixed with isopropyl alcohol and centrifuged. The solid polymer was then washed with isopropyl alcohol. Dark blue polymer (Mn=5,200, according to GPC) was obtained after overnight under vacuum. The polymers are soluble in various organic solvents. As shown in FIG. 4A-E, the UV-Vis absorption of Poly(3,4-ethylenedioxythiophene) (PEDOT) is different various in different solvents, likely due to the different interchain interactions, where the solvent is acetone in (A), chloroform in (B), tetrahydrofuran in (C), DMF in (D) and methanol in (E).

Another method to synthesize organic solvent soluble conducting polymers is through the modification of polymer backbone, or their pendent groups. Polythiophenes have been made soluble while maintaining their high electrical conductivity by the substitution of an alkyl chain onto the polymer repeating unit. Nanocomposites according to an embodiment of the invention were also prepared from polythiophene (P3HT) and MWNTs. Head to tail coupled Poly(3-hexylthiophene-2,5-diyl) (P3HT) was synthesized by using the McCullough method (See McCullough, Richard D.; Lowe, Renae D.; Jayaraman, Manikandan; Anderson, Deborah L. Design, synthesis, and control of conducting polymer aichitectures: structurally homogeneous poly(3-alkylthiophenes), Journal of Organic Chemistry (1993), 58(4), 904-12). The average molecular weight was between 5,000-15,000 g/mol. The solution of P3HT was prepared by dissolving 0.005 g of P3HT in 3 ml THF. The solution was heated to about 40° C. in water bath to improve the solubility and sonication was applied intermittently until the solid polymer was completely dissolved. The solution appeared to be bright orange. Then 400 μl of TFA was added into the P3HT solution with assistance of slight sonication.

A certain amount of multiwall carbon nanotube (varied from 0.00006 to 0.0125 g) was then directly added into the P3HT solution as received. Then the reaction mixture was sonicated for 2-3 minutes. For the MWNT obtained from Aldrich, the diameter was 110-117 nm and the length was 5-9 μm. It was observed that no apparent aggregate was formed. For the multiwall carbon nanotubes obtained from NanoLab, which were generally 15±5 nm in diameter and 5-20 μm in length, no apparent aggregate was observed up to 0.0005 g of carbon nanotube.

1 g of polymethyl-methacrylate (PMMA) powder with average molecular weight of 12,000 g/mol (Aldrich) was added into the mixture solution. The final MWNT/P3HT/PMMA solution was sonicated for 3-4 hours until all the PMMA powder was dissolved. The temperature of the water bath in the sonicator was controlled to be below 35° C. during sonication.

The composite film was obtained by casting the final MWNT/P3HT/PMMA solution on a glass slide by a draw-down bar (Paul N. Gardner Company, Inc) at 50 mils. The film was allowed to dry at ambient condition for 48 hours to allow the evaporation of solvent and TFA.

The electrical conductivity of the resulting film was measured. After the composite film was dried, two lines of silver paint with the length of 2 cm were cast onto the surface of the composite film to form the electrodes. The distance between the two electrodes was 0.3 cm. The thickness was measured by a digimatic caliper (Mitutoyo Corp.) with resolution of 0.001 cm. The resistance of the film was measured by a two probe method with a Keithley 6517A Electrometer/High-Resistance meter.

Figure 5A:
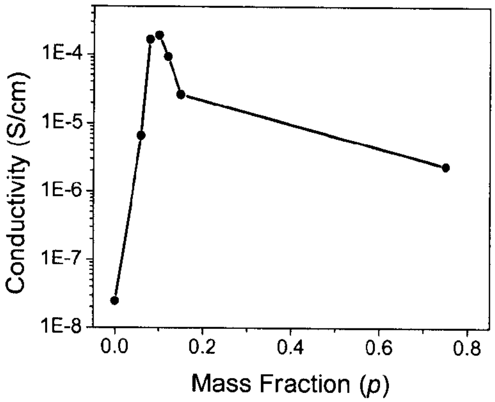
FIG. 5(*a*) shows measured electrical conductivity for a MWNT/P3HT/PMMA composite according to an embodiment of the invention in the range of 0 to 0.8 wt. % (shown as mass fraction).
Figure 5B:
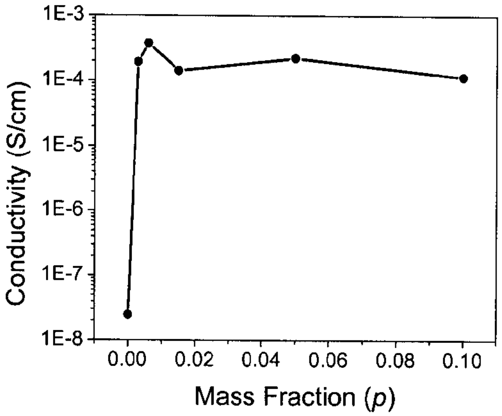

Electrical Conductivity of CNT/CP/Polymer Ternary Component Nanocomposite Materials The addition of conjugated conducting polymers to the CNT/host polymer nanocomposites improves the conductivity of the nanocomposites likely by reducing the electron hopping barrier energy between the carbon nanotubes. As an initial study, a set of MWNT/P3HT/PMMA composite thin film materials were prepared using the soluble P3HT synthesized. Although this study used MWNT as an example, the same principle may be applied to SWNTs, and mixtures of SWNTs and MWNTs as well. The conducting polymer effect was examined on both low aspect ratio (about 100 and high aspect ratio (about 1,000) MWNT composites. FIG. 5(*a*) shows measured electrical conductivity for the composite in the range of 0 to 0.8 wt. % (shown as mass fraction) P3HT. For a composite including 0.5 wt % P3HT, the percolation threshold of the ternary nanocomposite was found to decrease to lower than 0.06% compared to the percolation threshold of 0.67% for low aspect ratio MWNT/PMMA binary composite (with 0.5% P3HT). FIG. 5(*b*) shows measured electrical conductivity for the composite in the range of 0 to 0.1 wt. % (shown as mass fraction) P3HT. For high aspect ratio MWNT nanocomposite, the percolation threshold decreased from 0.05% to less than 0.003% after adding P3HT (0.5 wt. % P3HT) to the nanocomposite. From the data obtained, it was clear that the addition of conjugated polymer into the nanotube composite material decreased the percolation threshold of the nanocomposites orders of magnitude.

Synthesis of Water Dispersible PEDOT/MWNT Composite with High Conductivity

Multi-wall carbon nanotubes (MWNTs) purchased from Nanolab with diameter of 15±5 nm and length of 5-20 μm were used as received. Poly (4-styrenesulfonic acid) (PSS) with molecular weigh of 75,000 was purchased from Sigma-Aldrich as 18 wt. % aqueous solution. 3,4-ethylenedioxythiophene and sodium persulfate were all obtained from Sigma-Aldrich and used as received.

A series of PSS/CNT dispersions in water with the weight ratio of 2:1, 4:1, 8:1, and 30:1 were prepared. A representative procedure for 2:1 PSS/CNT dispersion is described as follows: 4 mg MWNT was added to 6 mL PSS water solution with the concentrations of 1.33 mg/mL. The solution was then sonicated for 3 h and stable colloid of PSS-wrapped MWNT in water was obtained. Experiments also showed that weight ratio of PSS/MWNT below 2:1 resulted in dispersion with less stability.

3.8 μL of the CP monomer 3,4-ethylenedioxythiophene (EDOT) was added to above 2:1 PSS/MWNT dispersion. The weight ratio between EDOT and PSS was 1.6:1. After the reaction mixture was shaken for one hour, EDOT was dissolved in the dispersion. A very small amount of precipitate was formed and was removed by centrifugation at 1500 rpm.

21.3 mg sodium persulfate (molar ratio between sodium persulfate and EDOT is 2.5:1) as oxidant was then added to the dispersion to initiate the polymerization of EDOT. The reaction mixture was gently shaken at room temperature for 24 h. After the polymerization, the product was purified by four centrifugation/re-dispersion cycles.

The PEDOT/PSS/CNT dispersion in water was cast onto a glass substrate and left air-dried for two hours under ambient condition and then further dried under vacuum for 24 h. The film obtained shows a deep blue color, which cannot be re-dissolved in water again. The film thickness was obtained by averaging four measurements on different spots of the film using a profilometer. Two probe electrical properties measurements at room temperature were carried out using Keithley 6517, and the resistance of the sample was obtained through current-voltage curve, which was further used to deduce the conductivity of the sample.

Figure 6:
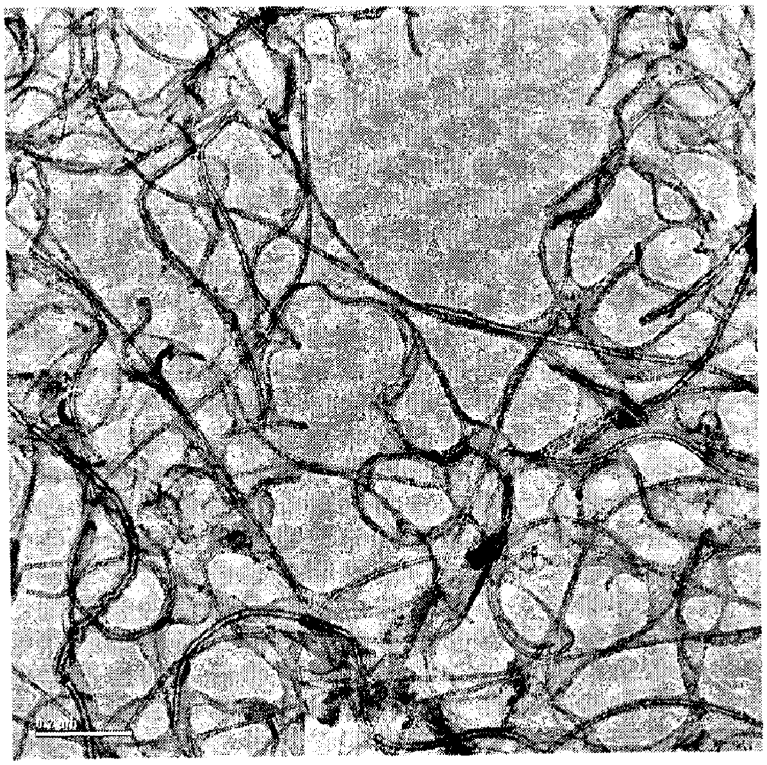
FIG. 6(*a*) shows a scanned TEM image of a MWNT wrapped by poly(styrenesulfonate) (PSS) according to an embodiment of the invention.
Figure 6:
Figure 7:
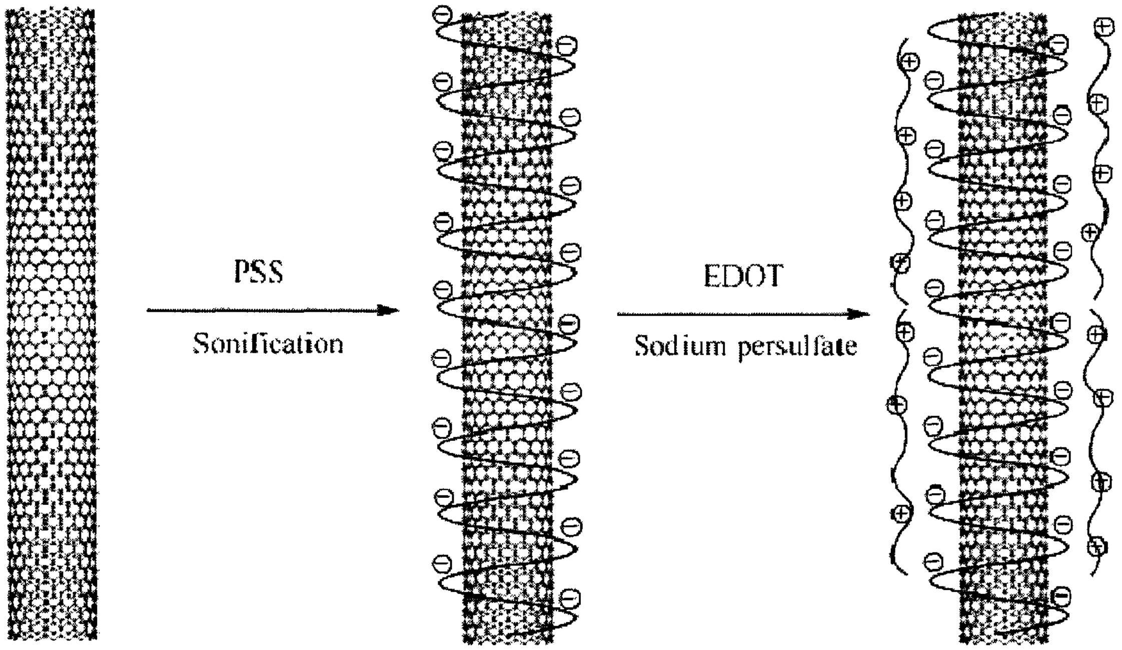
FIG. 7 shows a representation of a complex of PEDOT with PSS coupled through an electrostatic interaction which is related to certain embodiments of the invention.

The dispersion of MWNT by PSS according to an embodiment of the invention was studied by TEM as shown in the scanned TEM image shown FIG. 6(*a*). As shown in FIG. 6(*a*), MWNTs are wrapped by PSS and the highly negatively charged nature of PSS stabilized the MWNT as individual tubes. No aggregation or bundles of MWNT are shown throughout the image. Polymerization of EDOT then selectively took place on the surface of MWNT, leading to PEDOT/MWNT composite dispersible in water. FIG. 6(*b*) shows a scanned TEM of a resulting PEDOT/PSS/CNT composite according to an embodiment of the invention after addition of EDOT to the dispersion and polymerization. The TEM image of shown in FIG. 6(*b*) indicates that the MWNTs were still dispersed well as individual tubes. The maximum electrical conductivity that can generally be obtained through this approach is around 10-100 S/cm. PEDOT may complex with PSS through the electrostatic interaction depicted in the schematic of FIG. 7.

The conductivities of PEDOT/MWNT composites with different formulations are shown in Table 1 (below). The conductivity of PEDOT which is synthesized using the same procedure as PEDOT/MWNT except without addition of MWNT was also measured as controls. The conductivities of PSS/MWNT dispersions were also studied as a comparison.

TABLE 1

Formulation and 25° C. conductivity of PEDOT/MWNT and PSS/MWNT

| | EDOT (mg) | PSS (mg) | CNT (mg) | Conductivity (s/cm) |
|---|---|---|---|---|
| PEDOT/PSS/CNT-1 | 5 | 8 | 2 | 16 |
| PEDOT/PSS/CNT-2 | 5 | 8 | 1 | 20 |
| PEDOT/PSS/CNT-3 | 5 | 8 | 0.27 | 10 |
| PEDOT/PSS | 5 | 8 | 0 | 0.15 |
| PSSCNT-1 | 0 | 8 | 4 | 11.5 |
| PSS/CNT-2 | 0 | 8 | 2 | 9 |
| PSS/CNT-3 | 0 | 8 | 1 | 1.7 |

The weight ratio of EDOT and PSS was kept as 1:1.6 for all formulations because it has been previously shown that PEDOT synthesis using this ratio shows highest conductivity and good dispersity in water. From Table 1, it is seen that all PEDOT/PSS/CNT composites shows distinct improvement in conductivity compared with PEDOT/PSS, and the electrical conductivity does not change much with the increase of CNT content. This is not surprising since MWNT have high electrical conductivity and once it is well-dispersed into the PEDOT matrix, the conductivity will be greatly improved. PEDOT//PSS/CNT even shows higher conductivity than corresponding CNT dispersion. It is believed that in PSS/CNT dispersion the whole MWNT was wrapped by PSS which is less conductive, while for PEDOT/PSS/CNT composite, polymers wrapped on the surface of MWNT, leading to increased electrical conductivity. Besides the higher conductivity, another advantage of PEDOT/PSS/CNT over PSS/CNT is that after the casting film of PEDOT/PSS/CNT is formed and dried, the film is no longer soluble in water or other organic solvents. However the PSS/CNT film is still soluble in water, which makes it less applicable as conducting coatings.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used iii either the detailed description and/or the claims, such terms are intended to be inclusive in a manner similar to the term "comprising."

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

The invention claimed is:

1. A method of forming carbon nanotube-polymer composites, comprising the steps of:

forming a mixture solution comprising a plurality of carbon nanotubes dispersed in a co-solvent comprising an organic solvent and a second solvent comprising a short chain fluorinated carboxylic acid, said second solvent having a boiling point below 150° C., being less oxidizing than nitric acid, and being soluble in both said organic solvent and water;

mixing at least a first polymer with said mixture solution to form a polymer comprising mixture, and removing said co-solvent from said polymer comprising mixture to form a dispersed nanotube-polymer composite.

2. The method of claim 1, wherein said carbon nanotubes in said nanotube-polymer composite consist essentially of non-functionalized nanotubes.

3. The method of claim 1, further comprising the step of adding at least a second polymer different from said first polymer to said mixture solution.

4. The method of claim 3, wherein said first polymer or said second polymer comprises an electrically conducting polymer.

5. The method of claim 1, wherein said second solvent comprises trifluoroacetic acid.

6. The method of claim 1, wherein said second solvent comprises 1 to 20 volume % of said co-solvent.

7. A method of forming carbon nanotube-polymer composites, comprising the steps of:

forming a mixture solution comprising a plurality of carbon nanotubes dispersed in a co-solvent comprising an organic solvent and a second solvent comprising trifluoroacetic acid;

mixing at least a first polymer with said mixture solution to form a polymer comprising mixture, and removing said co-solvent from said polymer comprising mixture to form a dispersed nanotube-polymer composite.

8. The method of claim 7, wherein said trifluoroacetic acid comprises 1 to 20 volume % of said co-solvent.

9. The method of claim 7, wherein said carbon nanotubes in said nanotube-polymer composite consist essentially of non-oxidized nanotubes.

10. The method of claim 7, wherein said co-solvent consists of said organic solvent and said trifluoroacetic acid.

11. The method of claim 1, wherein said carbon nanotubes in said nanotube-polymer composite consist essentially of non-oxidized nanotubes.

12. The method of claim 1, wherein said co-solvent consists of said organic solvent and said second solvent, and said second solvent comprises trifluoroacetic acid.

* * * * *